Figure 1:
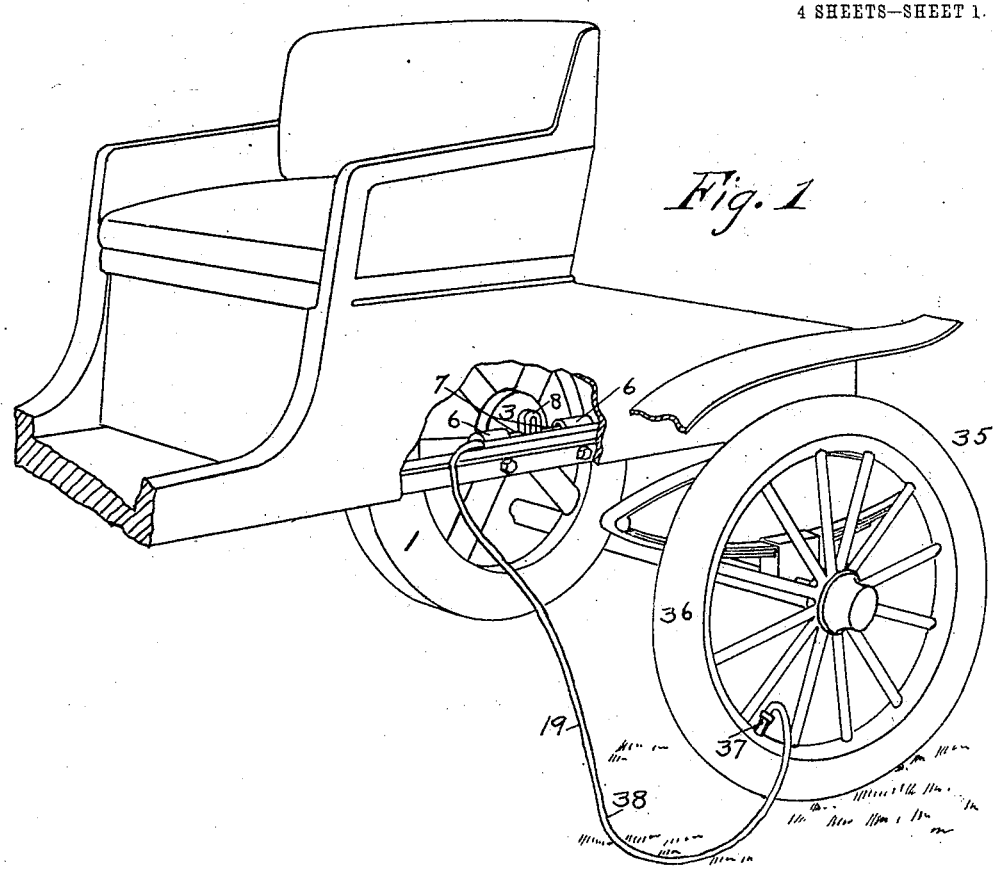

No. 825,572. PATENTED JULY 10, 1906.
M. A. BAKER.
APPARATUS FOR INFLATING VEHICLE TIRES.
APPLICATION FILED AUG. 28, 1903.

4 SHEETS—SHEET 1.

Witnesses
Harry A. Brooks
Mignon Ford

Inventor
Milo A. Baker
By
Charles S. Rogers
his Attorney.

No. 825,572.　　　　　　　　　　　　　PATENTED JULY 10, 1906.
M. A. BAKER.
APPARATUS FOR INFLATING VEHICLE TIRES.
APPLICATION FILED AUG. 28, 1903.
4 SHEETS—SHEET 2.
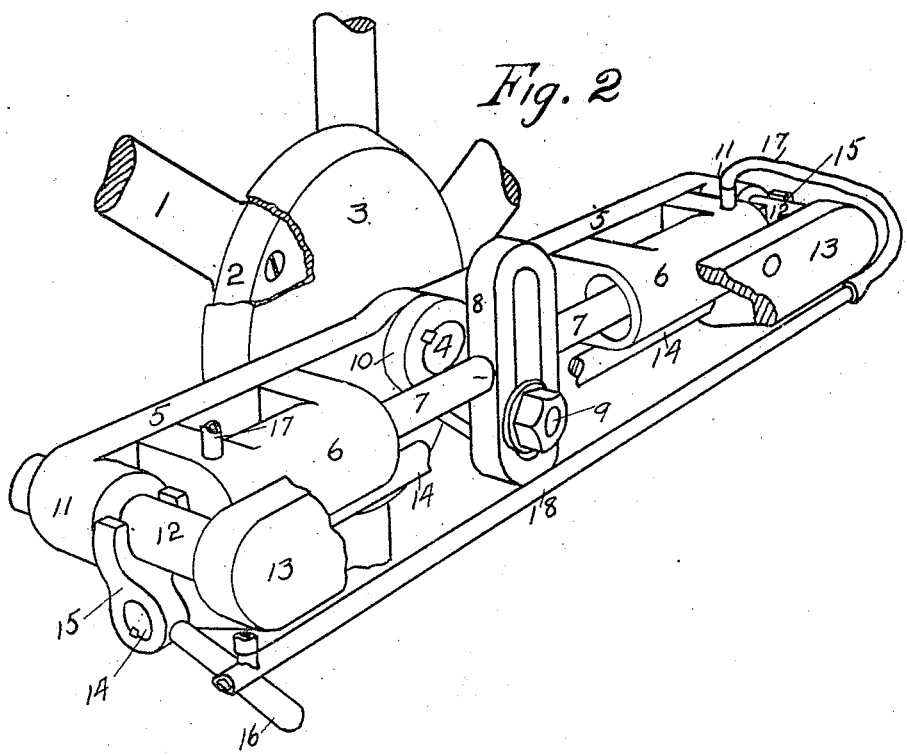
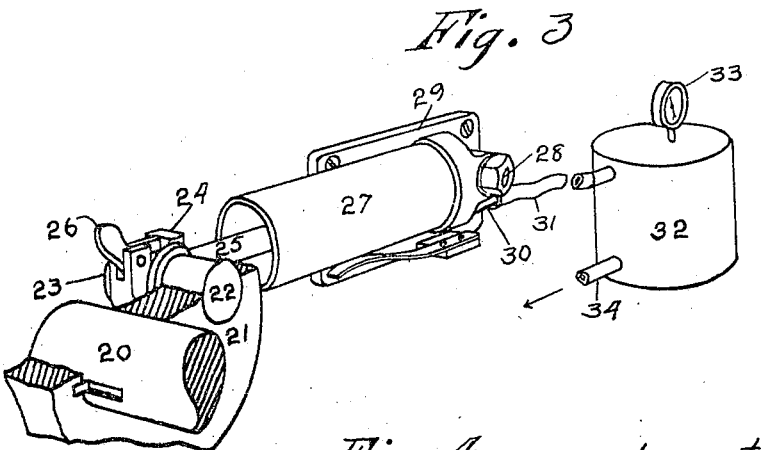
Witnesses
Harry G. Brooks
Mignon Ford
Inventor
Milo A. Baker
By
Charles S. Rogers
his Attorney.

No. 825,572. PATENTED JULY 10, 1906.
M. A. BAKER.
APPARATUS FOR INFLATING VEHICLE TIRES.
APPLICATION FILED AUG. 28, 1903.
4 SHEETS—SHEET 3.
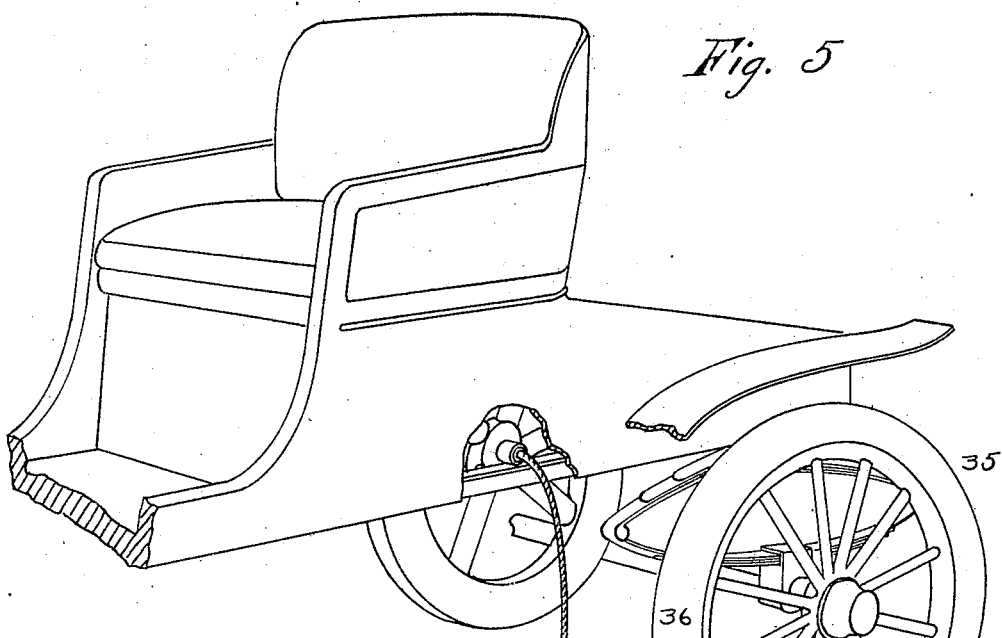
Fig. 5
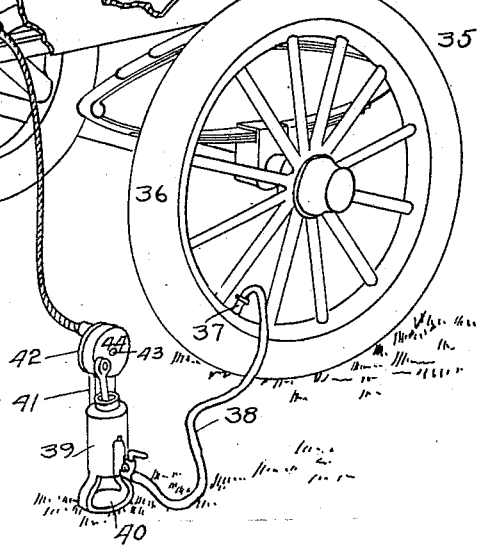
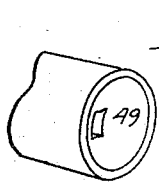
Fig. 7
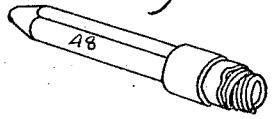
Fig. 8
Witnesses
Harry A. Brooks
Mignon Ford
Inventor
Milo A. Baker
By
Charles L. Rogers
his Attorney

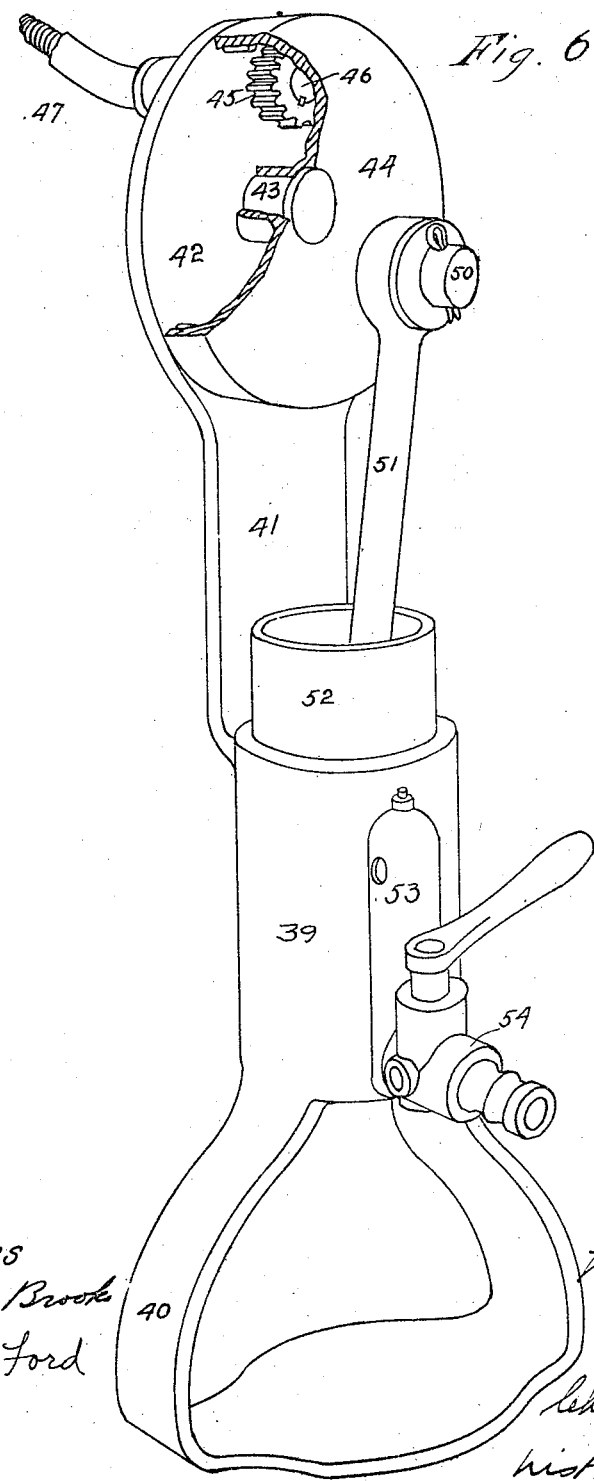

UNITED STATES PATENT OFFICE.

MILO A. BAKER, OF LOS ANGELES, CALIFORNIA, ASSIGNOR TO ALFRED T. FISHER, OF BROOKLYN, NEW YORK.

APPARATUS FOR INFLATING VEHICLE-TIRES.

No. 825,572.  Specification of Letters Patent.  Patented July 10, 1906.

Application filed August 28, 1903. Serial No. 171,130.

*To all whom it may concern:*

Be it known that I, MILO A. BAKER, a citizen of the United States, residing at Los Angeles, in the county of Los Angeles and State of California, have invented certain new and useful Improvements in Apparatus for Inflating Vehicle-Tires; and I do hereby declare the following to be a full, clear, and exact description of the invention, such as will enable others skilled in the art to which it appertains to make and use the same.

This invention relates to horseless vehicles, and particularly to attachments to motor-vehicles for generating or compressing air or other fluid media; and some of the objects of the invention are to provide such means which will be simple and cheap in construction, while being positive and efficient in operation.

Another object of the invention is to provide means driven from the driving-shaft of the vehicle for inflating the tires upon the wheels thereof or driven frictionally from the fly-wheel of such vehicle.

With these and other objects in view the invention consists, essentially, in the construction, combination, and arrangement of parts, substantially as more fully described in the following specification and as illustrated in the accompanying drawings, forming part of this application, in which—

Figure 1 is a perspective view of a portion of a motor-vehicle, showing an application of the invention thereto. Fig. 2 is a detail perspective view, partly broken away, showing one form of the invention, which is driven from the fly-wheel of the motor or engine. Fig. 3 is a detail perspective view, partly broken away, showing a modified form of construction. Fig. 4 is a detail view of the construction shown in Fig. 2. Fig. 5 is a perspective view, partly broken away, showing an application of another form of the invention wherein a flexible shaft is employed. Fig. 6 is an enlarged perspective view, partly broken away, illustrating the construction of the pump and driving mechanism shown in Fig. 5; and Figs. 7 and 8 are detail views of the end of the engine-shaft and flexible shaft, respectively.

Similar characters of reference designate corresponding parts throughout the several views.

Referring to the drawings, and particularly to Figs. 1 and 2 thereof, reference character 1 designates a fly-wheel of a motor or engine preferably mounted on a horseless or motor-propelled vehicle, although the invention is not limited to use upon such vehicles, as it is capable of varied uses and applications.

Formed on or connected with the hub of the fly-wheel is a frusto-conical disk or internal member 2 of a clutch, the exterior member 3 whereof is mounted on a shaft 4, whereon is mounted a frame 5, preferably provided with cylinders 6, in which may be mounted suitable pistons having piston-rods 7, connected, preferably, with a slotted cross-head 8, movably engaging a pin or stud 9 upon a crank 10, keyed upon the shaft 4, substantially as illustrated in Fig. 2 of the drawings.

A frame or hanger 13 may be attached to the vehicle in any suitable manner and may support shafts or studs 12, passing through or engaging bearings 11 in the ends of a movable or traveling frame, and in the hanger 13 is mounted a shaft 14, having yokes 15, rigidly secured to the extremities thereof, provided with a handle or handles 16, by means of which the shaft 14 is oscillated and the yokes 15 are forced against the frame 5, thereby pressing the exterior member 3 of the clutch into engagement with the interior member 2 thereof, so that the shaft 4 is rotated by the movement of the fly-wheel, and the crank on said shaft imparts a reciprocating motion to the cross-head 8, carrying the piston-rod 7, as will be readily understood by those skilled in the art to which this invention appertains.

Connected with the cylinders 6 in any suitable manner are flexible or other tubes 17, adapted to be connected, preferably, with a pipe 18, communicating or constructed to be connected with the flexible tube or pipe 38, attachable with valves 37 upon the tires 36 of the wheels 35 of the vehicle, whereby the air forced from the cylinders may be conducted to such tires, and the latter may be inflated or dilated by means of the power generated by the engine or motor of the vehicle without the necessity of inflating such tires by manual labor as ordinarily done.

Adverting now particularly to the construction illustrated in Figs. 3 and 4 of the drawings, the reference character 20 designates a portion of the driving-shaft of the vehicle motor or engine upon which is keyed a disk 21, carrying a crank-pin 22, preferably provided with a collar 23, constructed to engage a fork or yoke 24 on the end of a piston-rod 25 and to be held therein by a latch or other device 26, substantially as shown in Figs. 3 and 4 of the drawings.

The cylinder 27 is preferably constructed to oscillate on the pin or pivot 28, mounted on the frame or plate 29, constructed to be suitably secured upon the frame or running-gear of a vehicle, and the closed end of the cylinder is preferably provided with a tube or nozzle 30, having a check-valve and to which is connected a flexible pipe 31, communicating with a reservoir or tank 32, which may be provided with a pressure-gage 33 and with a nozzle or tube 34, adapted to be connected with the valve of the tire or tires of the vehicle when it is desired to inflate the same.

In Figs. 5 to 8 of the drawings there is illustrated an automobile provided with suitable wheels 35, having inflatable tires 36, provided with a valve 37, constructed to receive a flexible tube or other device 38, which may be connected with a cylinder 39, desirably provided with a stirrup or other device 40 for retaining the same in position during the operation thereof, as will be readily understood. Formed on or connected with the cylinder or stirrup is an extension 41, terminating in a disk or circular plate 42, through which passes a stud or shaft 43, whereon is an internal or external gear, preferably an internal gear 44, meshing with and driven by a pinion 45 upon a shaft 46, mounted eccentrically in said disk and carrying a flexible extension or shaft 47, constructed to be removably connected by means of the angular extremity 48 thereof, Fig. 8, with the recessed end of the motor or engine shaft 49, said shaft 49 being preferably provided with an angular recess in one end thereof, substantially as illustrated in Fig. 7 of the drawings.

Movably mounted upon the crank-pin 50, formed on or connected with the internal gear 44, is a piston-rod 51, connected with the piston 52, operating in the cylinder 39, preferably mounted on the lower portion of the extension 41, and said cylinder is preferably provided with a relief or pop valve 53 and with a three-way valve 54, one outlet whereof may be adapted to receive the flexible tube 38, substantially as shown in Fig. 5 of the drawings.

The operation of this invention will be readily understood from the foregoing description when taken in connection with the accompanying drawings, and further explanation thereof will not be required.

The power of the motor or engine upon the vehicle may be utilized when the vehicle is at rest to pump up or inflate the tires upon the wheels of the vehicle after the flexible tubes have been connected with the valves of such tires in the usual manner.

It is not desired to limit or confine this invention to the specific construction, combination, and arrangement of parts herein shown and described, and the right is reserved to make all such changes in and modifications of the same as come within the spirit and scope of the invention.

I claim—

1. The combination with a rotatable member of a power-driven vehicle, of a guide fixed to the vehicle, a pump including a cylinder and complementary air-compressing mechanism carried thereby, said cylinder mounted upon said guide and means whereby the cylinder is movable on said guide toward and from the rotatable member.

2. The combination with a rotatable member of a power-driven vehicle, of a bed-frame fixed to the vehicle, a pump-cylinder with its piston and actuating mechanism, said cylinder being movably mounted relative to the bed-frame, and provided with a member to be driven, and means whereby the cylinder with its piston and actuating mechanism is movable toward and from the rotatable member to engage and disengage the driven member with the driving member.

3. A vehicle provided with inflatable tires, a driving device for the vehicle having a shaft, a guide fixed to the vehicle, complementary air-compressing mechanism mounted on said guide and having a driven member adapted to be disconnectibly connected with said shaft to actuate the air-compressing mechanism, and means for conveying the compressed air to the tires of the vehicle.

4. A vehicle provided with inflatable tires, a motor to propel the vehicle, a guide fixed to said vehicle, inflating apparatus mounted on said guide and including a cylinder and piston, said cylinder having air-conducting means adapted to detachably connect with said tires, actuating means for the piston normally out of engagement with said motor, and means for effecting the engagement of said actuating means and motor to inflate the tires.

5. A vehicle provided with inflatable tires, a motor to propel the vehicle, fluid-pressure apparatus provided with an air-conductor having detachable connection with said tires, a cross-head connected with said apparatus and means normally engaging said cross-head and normally disengaged from said motor constructed to be forced into engagement therewith to operate said apparatus.

6. A motor-vehicle provided with a drive-shaft, cylinders having pistons and piston-rods, an intermediate cross-head connected with said rods, a crank engaging said cross-head, connection between said cylinders and the tires of the vehicle, and means for effecting the temporary engagement between said shaft and crank.

7. A motor-vehicle provided with a drive-shaft, a crank provided with a crank-pin, a slotted cross-head engaging said pin, cylinders, pistons therein having piston-rods in engagement with said cross-head, and means connecting the cylinders with the tires of the vehicle.

8. A vehicle provided with a motor and a fixed guide, a fluid-pressure cylinder and actuating means therefor shiftable relative to said guide, whereby it may be connected with or disconnected from the motor.

9. A vehicle provided with propelling means, a disk, an inflating apparatus including a cylinder and piston and actuating means connected with said disk, and means for effecting the operation of the parts through the connection of said disk.

10. A vehicle provided with propelling means having a shaft, a clutch member secured thereon, another clutch member having a crank, inflating devices, a cross-head engaging said crank and connected with said devices, and means for forcing said clutch members into engagement to operate said devices.

11. A vehicle provided with propelling means, a movable frame having a shaft mounted therein carrying a crank, a cross-head connected with said crank, fluid-pressure devices attached to said cross-head, a hanger having guides for said frame, a shaft in said hanger carrying yokes to operate said frame and means for effecting the engagement of said frame and propelling means.

In testimony whereof I have signed my name to this specification, in the presence of two subscribing witnesses, at Los Angeles, in the county of Los Angeles, State of California, this 20th day of August, 1903.

MILO A. BAKER.

Witnesses:
FRED L. BAKER,
H. T. MORROW.